US008760253B2

(12) United States Patent
Hickox

(10) Patent No.: US 8,760,253 B2
(45) Date of Patent: Jun. 24, 2014

(54) ELECTRICAL COIL ASSEMBLY INCLUDING A FERRITE LAYER AND A THERMALLY-CONDUCTIVE SILICONE LAYER

(75) Inventor: Jeffrey Michael Hickox, Middlefield, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/613,786

(22) Filed: Sep. 13, 2012

(65) Prior Publication Data

US 2013/0181797 A1   Jul. 18, 2013

Related U.S. Application Data

(60) Provisional application No. 61/587,272, filed on Jan. 17, 2012.

(51) Int. Cl.
*H01F 27/06*   (2006.01)
*H01F 27/08*   (2006.01)

(52) U.S. Cl.
USPC .............................. 336/61; 336/55; 29/602.1

(58) Field of Classification Search
CPC ............. H01F 27/2804; H01F 41/041; H01F 2027/2819; H01F 27/06; H01F 27/22; H01F 27/2876; H01L 23/373; H01L 2023/405; H01L 23/36; H05K 7/20481; H05K 1/183; H05K 1/0209
USPC ................ 336/55, 61, 65, 196, 198; 29/602.1
See application file for complete search history.

(56) References Cited

U.S. PATENT DOCUMENTS 4,794,355 A * 12/1988 Harris ........................... 333/219
5,541,567 A *  7/1996 Fogel et al. ................... 336/200
6,008,622 A * 12/1999 Nakawatase .................. 320/108
6,049,191 A    4/2000 Terazoe et al.

(Continued)

FOREIGN PATENT DOCUMENTS

WO       2012099170 A1    7/2012

OTHER PUBLICATIONS

Masato Chigira, et al.: "Small-Size Light-Weight Transformer with New Core Structure for Contactless Electric Vehicle Power Transfer System", Nat University Corp Saitama University, 978-1-4577-0541-0/11, 2011 IEEE, pp. 260-266.
European Search Report dated May 2, 2013.

*Primary Examiner* — Elvin G Enad
*Assistant Examiner* — Joselito Baisa
(74) *Attorney, Agent, or Firm* — Robert J. Myers

(57) ABSTRACT

An electrical coil assembly includes a first housing and a second housing that surroundingly encloses the first housing. The coil assembly includes a ferrite layer and a thermally-conductive silicone layer that overlies the ferrite layer. A wire conductor surrounds the first housing. A structure is received in an opening defined in the first housing to be in thermal communication with the thermally-conductive silicone layer. Another thermally-conductive silicone layer overlies the first housing and the structure so that the structure is also in thermal communication therewith. A metal layer further overlies the thermally-conductive silicone layer that overlies the first housing. The second housing includes a non-dielectric cover and a dielectric cavity portion that receives the first housing. The coil assembly is associated with an electrical charging system that electrically charges an energy storage device disposed on a motorized vehicle.

13 Claims, 8 Drawing Sheets

(56) References Cited

U.S. PATENT DOCUMENTS

| | | |
|---|---|---|
| 6,291,969 B1 * | 9/2001 | Kaneko ......................... 320/108 |
| 6,809,265 B1 | 10/2004 | Gladd et al. |
| 6,888,438 B2 * | 5/2005 | Hui et al. ...................... 336/200 |
| 7,116,200 B2 | 10/2006 | Baarman et al. |
| 7,728,551 B2 | 6/2010 | Reed et al. |
| 8,008,888 B2 | 8/2011 | Oyobe et al. |
| 8,035,255 B2 | 10/2011 | Kurs et al. |
| 8,169,185 B2 | 5/2012 | Partovi et al. |
| 8,174,233 B2 | 5/2012 | Julstrom et al. |
| 8,258,911 B2 * | 9/2012 | Fouquet ........................ 336/200 |
| 8,373,310 B2 * | 2/2013 | Baarman et al. .............. 307/104 |
| 2011/0273025 A1 | 11/2011 | Amano et al. |

* cited by examiner

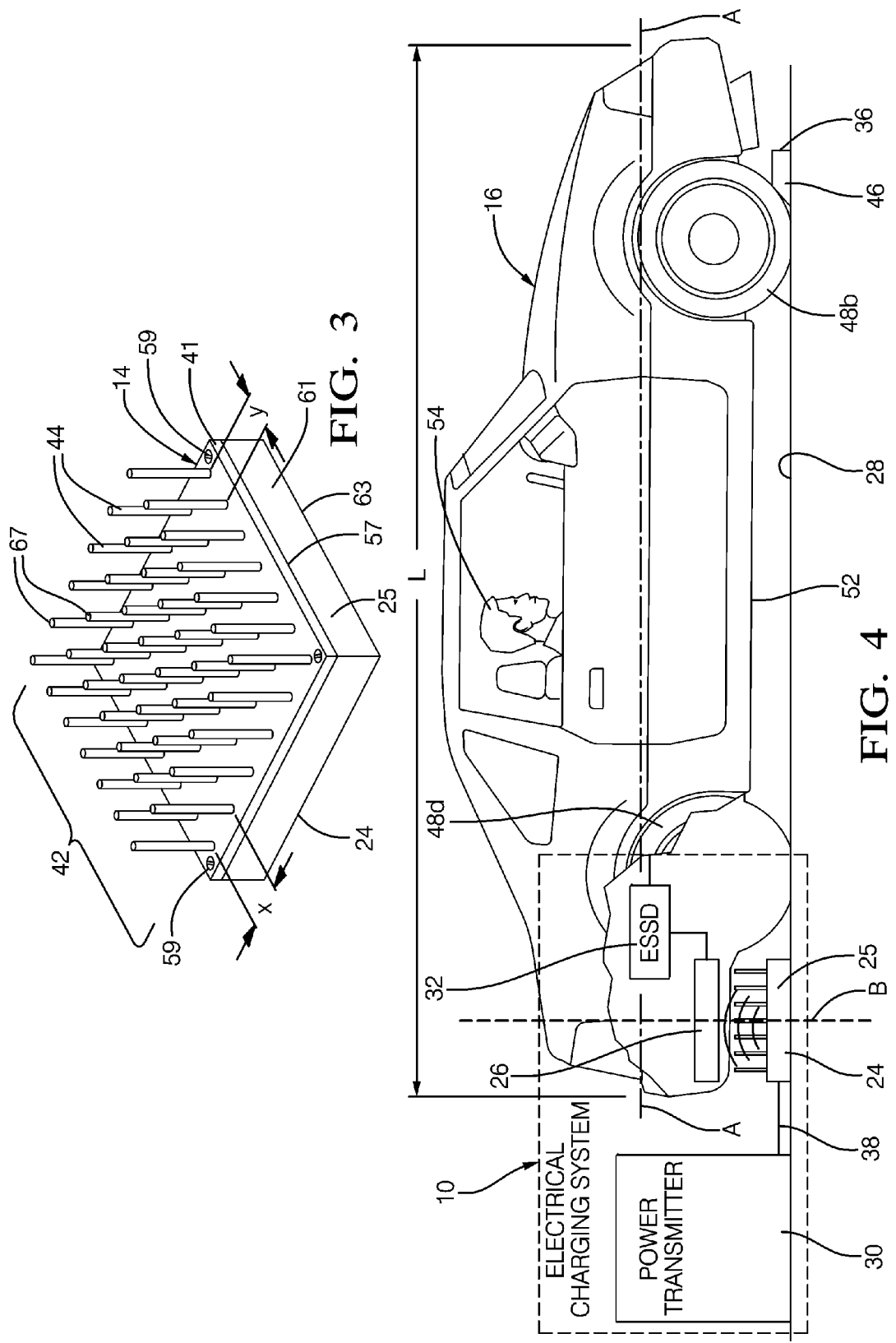

ELECTRICAL COIL ASSEMBLY INCLUDING A FERRITE LAYER AND A THERMALLY-CONDUCTIVE SILICONE LAYER

CROSS-REFERENCE TO RELATED APPLICATION

This application claims priority to U.S. Provisional Patent Application No. 61/587,272 filed on 17 Jan. 2012.

TECHNICAL FIELD OF THE INVENTION

The invention relates to a transducer used in wireless electric vehicle charging, more particularly, provisions associated with the transducer allow for effective heat transfer out of a coil arrangement of the transducer while further allowing ease of manufacture of the transducer.

BACKGROUND OF THE INVENTION

It is known to electrically charge a battery of a vehicle using an electrical charging system in which at least a portion of the energy used to electrically charge the battery is wireless transmitted through the charging system without using a wired connection.

Energy is transferred from a source transducer typically located on a ground surface proximate a vehicle. A corresponding transducer disposed on the vehicle receives at least a portion of this energy which is subsequently used to electrically charge a battery disposed on the vehicle. Another transducer uses an encapsulated epoxy that surrounds a coil having a ferrite layer to assist in heat dissipation away from the coil during electrical charging of the battery, especially during high current charging conditions. The encapsulated epoxy transducer, however, has a high cost to manufacture, is difficult to fabricate using high speed, automated manufacturing processes, and has a relatively heavy weight, or mass. In some embodiments a transducer may have an undesired heavy mass of about 13.6 kg (30 pounds).

Thus, what is needed is a robust transducer element that overcomes these shortcomings by effectively transferring heat out from the coil during electrical charging of a battery, is conducive for high speed manufacturing, and has less overall mass.

BRIEF SUMMARY OF THE INVENTION

In accordance with one embodiment of the invention, a coil apparatus includes a housing. The housing has a coil arrangement disposed therein. The coil arrangement includes a ferrite layer and a thermally-conductive silicone layer that overlies the ferrite layer.

In accordance with another embodiment of the invention, a method is presented to manufacture a coil apparatus. One step in the method is providing a housing that includes a coil arrangement disposed therein. Another step in the method is providing a ferrite layer of the coil arrangement to overlie an internal surface of the housing. A further step of the method is providing a thermally-conductive silicone layer of the coil arrangement to overlie the ferrite layer.

Further features, uses and advantages of the invention will appear more clearly on a reading of the following detailed description of the embodiments of the invention, which are given by way of non-limiting example only and with reference to the accompanying drawings.

BRIEF DESCRIPTION OF THE SEVERAL VIEWS OF THE DRAWING

This invention will be further described with reference to the accompanying drawings in which:

FIG. 3 shows an isometric view of the off-vehicle transducer of the electrical charging system of FIG. 2 in which the animal deterrent device is deployed on a top external surface thereof;

FIG. 4 shows a side view of the electrical charging system of FIG. 2 in which the on-vehicle transducer disposed on the vehicle has a vertically spaced alignment to overlie the animal deterrent device/off-vehicle transducer of FIG. 3;

DETAILED DESCRIPTION OF THE INVENTION

It is desired to produce a transducer that is easily manufactured having a smaller size and overall mass. In addition, a transducer fabricated using high-volume manufacturing techniques may result in a transducer that has a lower manufacturing cost. A lighter weight transducer may desirably allow for increased fuel economy for the vehicle. With a potential of 3000 watts being applied/received especially by a transducer that has a smaller size, internal generated heat within the transducer must be quickly and effectively be transferred out from the transducer to ensure optimal transducer and optimal charging system operation. This is especially desired when the transducer is mounted on a vehicle, such as on an undercarriage of the vehicle.

In an electrical charging system application, one transducer may wirelessly transmit magnetic energy to another transducer that receives the transmitted energy. In some embodiments, the transducers are configured to transfer energy at a sufficiently high rate which may require a respective physical size of the transducers to be approximately 0.5 meters (m) in length by 0.5 meters (m) in width by 3 centimeters (cm) in height. Alternately, in contrast to magnetic energy, the transducers may be constructed to wirelessly transmit/receive inductive energy or electrical energy. If the transducer is disposed on a ground surface and the transmitting transducer remains in operation, heat generated within the ground-based transducer may entice an animal, like a dog or cat, to reside on top of, or adjacent a housing of the ground-based transducer so that the dog or the cat may absorbingly enjoy the warmth of the emitted heat. For example, if the dog or the cat decides to reside on top of the warmed transducer, the animal may also further be susceptible to high power magnetic energy during operation of the transducer. The transmission of magnetic energy through an animal during operation of the transducer negatively affecting maximum energy transfer efficiency between the transducers and may also negatively affect the animal's health. Transducers that do not have maximum energy transfer therebetween may result in an electrical charging system that undesirably electrically charges a battery in a longer time period that may have a undesired, increased energy cost to a human operator of the electrical charging system.

Figure 1:
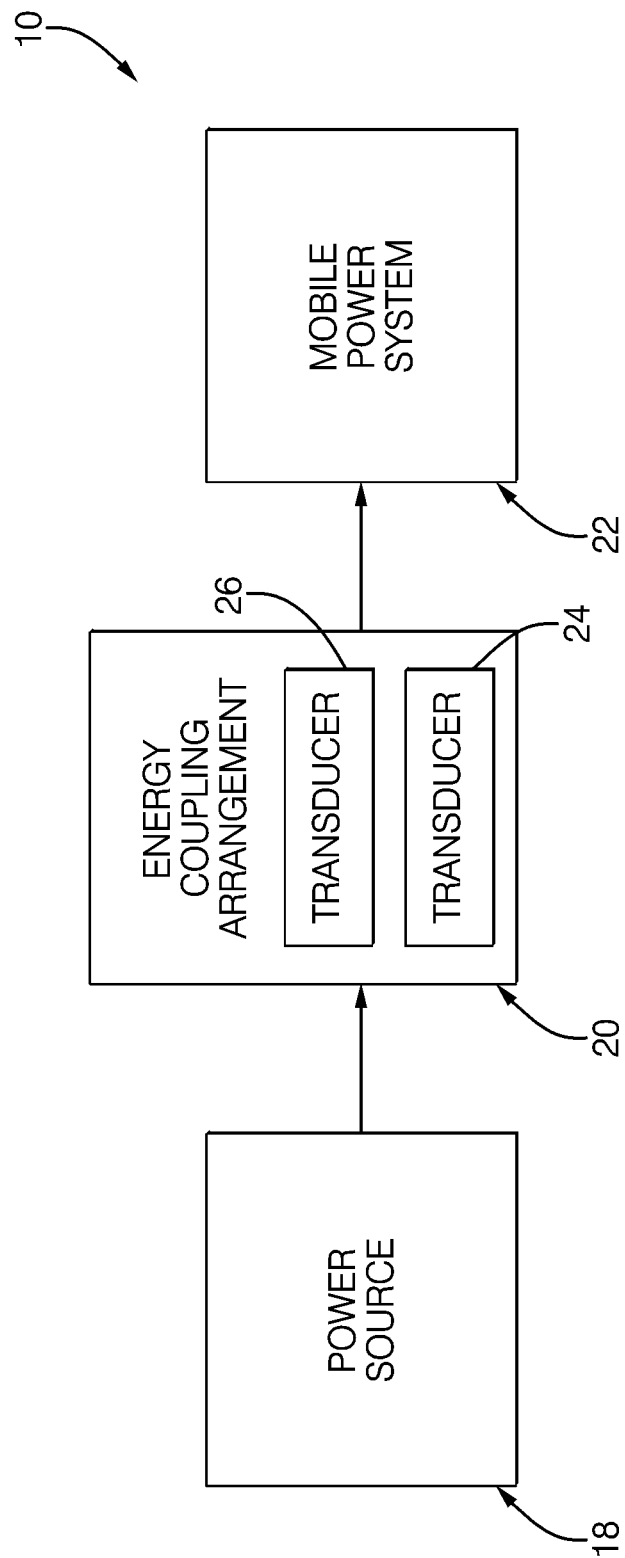
FIG. 1 shows a block diagram of an electrical charging system that includes a pair of transducers associated with an energy coupling arrangement, according to the invention.
Figure 2:
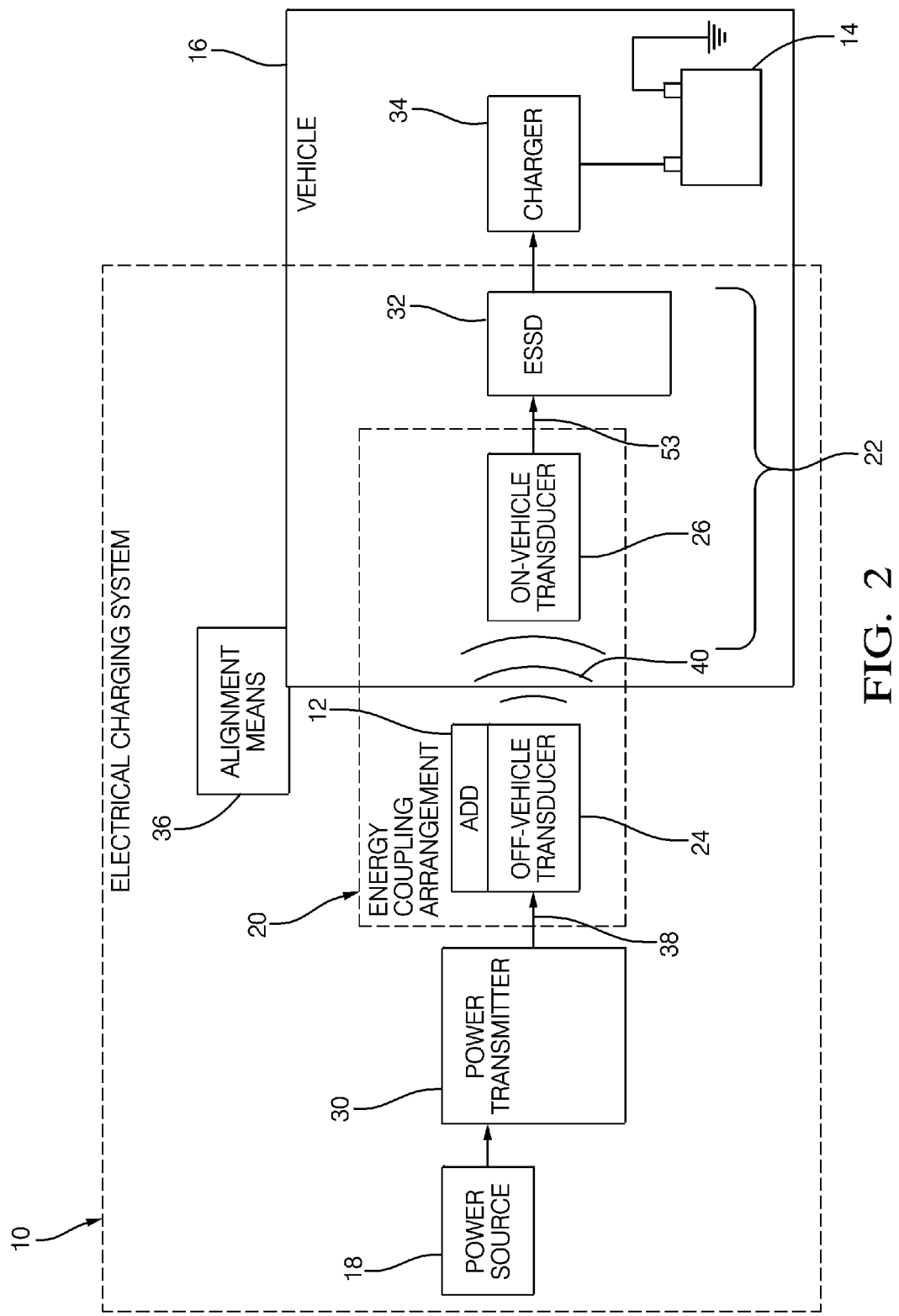
FIG. 2 shows a more detailed block diagram of the electrical charging system that contains the pair of transducers of FIG. 1 including an off-vehicle transducer and an on-vehicle transducer, and details thereof which include the off-vehicle transducer having an animal deterrent device.

Referring to FIGS. 1-3, then, an electrical charging system 10 contains an off-vehicle transducer 24 that includes an animal deterrent device 12. The animal deterrent device 12 advantageously discourages an animal (not shown) from being disposed, or located on off-vehicle transducer 24, especially during operation of the charging system 10. The charging system 10 is used to electrically charge an electrical storage device, or battery 14 disposed on a vehicle 16. The charging system 10 is formed of electrical circuit components, such as resistors, capacitors, inductors, invertors, switches, relays, transistors, and the like. Battery 14 may include a plurality of batteries, or battery cells that often are associated with electrically charging a hybrid or electric vehicle that assist to power a drivetrain of such vehicles. The charging system 10 includes an energy coupling arrangement 20 and a mobile power system 22. A portion of energy coupling arrangement 20 and mobile power system 22 of the charging system 10 are respectively disposed on vehicle 16. Another portion of energy coupling arrangement 20 is disposed external to vehicle 16 and configured to communicate with a power source 18. Energy coupling arrangement 20 includes a first coil apparatus, or on-vehicle transducer 26 and a second coil apparatus, or off-vehicle transducer 24. On-vehicle transducer 26 is configured to receive magnetic energy wirelessly transmitted by off-vehicle transducer 24 which is used to electrically charge battery 14. Off-vehicle transducer 24 is disposed external to vehicle 16 and on-vehicle transducer 26 is disposed on vehicle 16. The animal deterrent device 12 associated with off-vehicle transducer 24 may be purchased by consumers of the charging system 10 that are pet owners, or alternately, the animal deterrent device may be included as part of the charging system when the charging system is purchased by consumers. The animal deterrent device and other embodiments of the animal deterrent device are described in greater detail in U.S. Patent Application Publication 2013/0033797 which is the publication of U.S. patent application Ser. No. 13/552,730 entitled "ANIMAL DETERRENT DEVICE FOR ELECTRICAL CHARGING SYSTEM," filed on 19 Jul. 2012, and incorporated herein in its entirety. Referring to FIGS. 2-6, off-vehicle transducer 24 is configured for fixed, secure attachment to a ground surface 28. Off-vehicle transducer 24 may be fixedly secured to ground surface 28 using fasteners such as concrete screws or bolts as is known in the fastening arts. Still alternately, the off-vehicle transducer may be secured to the ground surface using adhesive. When off-vehicle transducer 24 is secured to ground surface 28, secured off-vehicle transducer may also be referred to herein as a ground-based transducer. Off-vehicle transducer 24 includes a housing 61. The animal deterrent device 12 is configured for fixed attachment to a first, or top external surface 57 of housing 61 of the off-vehicle transducer 24. A portion of housing 61 of off-vehicle transducer 24 may be formed from a plastic material that may further allow for optimal transmission of the magnetic energy out from off-vehicle transducer 24 towards on-vehicle transducer 26. Preferably, this dielectric portion is a top portion of off-vehicle transducer 24 that faces on-vehicle transducer 26. A housing of the off-vehicle transducer completely formed from a metal material may undesirably affect the magnetic transmission performance of the off-vehicle transducer. The magnetic energy is generally wirelessly transmitted up through the housing of off-vehicle transducer 24 and the animal deterrent device 12 towards on-vehicle transducer 26 when off-vehicle transducer 24 is securely mounted on ground surface 28 and on-vehicle transducer 26 is within the vicinity of off-vehicle transducer 24, such as when on-vehicle transducer 26 overlies off-vehicle transducer 24, as best illustrated in FIG. 4. Thus, when off-vehicle transducer 24 is mounted to ground surface 28, the animal deterrent device 12 is disposed in a manner on off-vehicle transducer 24 so as to be remotely disposed from ground surface 28. When the animal deterrent device 12 is attached to off-vehicle transducer 24, the animal deterrent device 12 discourages an animal (not shown) from residing on the off-vehicle transducer 24 where the animal deterrent device 12 is coveringly deployed. More particularly, The animal deterrent device 12 is provided to be an effective animal deterrent when at least a portion of vehicle 16 overlies The animal deterrent device 12 attached to the off-vehicle transducer 24. When the animal does not overlie the off-vehicle transducer 24, this may desirably assist to ensure maximum energy transfer efficiency between transducers 24, 26 during operation of the charging system 10. In addition, when the animal does not overlie the off-vehicle transducer 24, the animal may also be less susceptible to exposure to transmitted magnetic energy configured that emits from the off-vehicle transducer 24. If the animal is located at a remote point disposed at an increased distance in a direction moving away from the off-vehicle transducer 24 during operation of the off-vehicle transducer 24, the animal's exposure to transmitted magnetic energy may also be lessened. Power source 18 provides power to off-vehicle transducer 24 of energy coupling arrangement 20. For example, the power source may operate on AC voltage (VAC) which may be 120 VAC. Alternately, the AC voltage may be greater than 120 VAC. Power source 18 and the off-vehicle transducer 24 that includes the animal deterrent device 12 are each respectively disposed external to vehicle 16. The animal deterrent device 12 may be secured to off-vehicle transducer 24 by an operator 54 of the charging system 10 which also may be the driver of vehicle 16. Likewise, off-vehicle transducer 24 may be secured to ground surface 28 by the operator 54.

the charging system 10 further includes a power transmitter 30 and an electrical signal shaping device (ESSD) 32. Power transmitter 30 is disposed intermediate to, and in electrical communication with power source 18 and energy coupling arrangement 20. An output 53 of energy coupling arrangement 20 is in downstream electrical communication with the signal shaping device 32. Power transmitter 30 is configured for electrical communication with power source 18 and off-vehicle transducer 24 that includes the animal deterrent device 12. Off-vehicle transducer 24 is configured for operation when power transmitter 30 is electrically connected with power source 18. Power transmitter 30 supplies the necessary power via a voltage or a current electrical signal carried on an output 38 to the off-vehicle transducer 24 so that the off-vehicle transducer 24 is configured to wirelessly transmit magnetic energy 40 to on-vehicle transducer 26. On-vehicle transducer 26 receives the wirelessly transmitted magnetic energy 40 and converts the received magnetic energy to electrical energy which is further transmitted and electrically shaped by the signal shaping device 32 and subsequently used to electrically charge battery 14. Alternately, the power transmitter may supply an electrical signal to operate the ground-based transducer that is a combination of both voltage and current. A vehicle charger 34, which is further controllable by vehicle 16, receives an output electrical signal from the signal shaping device 32. Vehicle charger 34 also produces an output electrical signal that is in electrical communication with battery 14. Other electronic devices disposed in vehicle 16 may further decide to allow or prevent electrical charging of battery 14 by further controlling operation of vehicle charger 34. For example, the vehicular electronic devices may have information that indicates that the battery is at a full state of electrical charge and communicate this information with the vehicular charger so as to not allow further electrical charging of the battery. On-vehicle transducer 26, the signal shaping device 32, and vehicle charger 34 are respectively disposed on vehicle 16. Power transmitter 30, in addition to power source 18 and the animal deterrent device 12 attached to off-vehicle transducer 24 as previously described herein, are disposed external to vehicle 16. The charging system 10 further includes an alignment means 36 that facilitates the positioning of vehicle 16 so that alignment of on-vehicle transducer 26 and the off-vehicle transducer 24 that includes the animal deterrent device 12 occurs so that battery 14 may be electrically charged.

Turning our attention more particularly now to FIG. 3, a more detailed view of off-vehicle transducer 24 that includes the animal deterrent device 12 is illustrated. The animal deterrent device 12 is separately distinct from off-vehicle transducer 24 prior to attachment with off-vehicle transducer 24. The animal deterrent device 12 is deployable onto top external surface 57 of off-vehicle transducer 24. Planar, top external surface 57 is generally parallel with and opposingly remote to a second, or bottom external surface 63 and ground surface 28 when off-vehicle transducer 24 is secured thereto. In other words, top external surface 57 faces away from ground surface 28 of the off-vehicle transducer 24. Bottom external surface 63 is adjacent ground surface 28 when off-vehicle transducer 24 is fixedly secured to ground surface 28. When the animal deterrent device 12 is deployed on top external surface 57 of off-vehicle transducer 24, an animal deterrent device/transducer assembly is formed. The animal deterrent device 12 includes a uniform, generally non-flexible, non-yielding, planar base 41 adapted for placement on the planar top external surface 57. Alternately, the top external surface of the off-vehicle transducer may be non-planar, such that, for example, it may have an arcuate, concave external surface. The base of the animal deterrent device then may be constructed to conform to generally shapingly fit the non-planar top external surface of the off-vehicle transducer. Base 41 is dimensioned large enough to coveringly overlie top external surface 57. Base 41 is placed on top external surface 57 so that an array of animal deterring elements 42 extendingly protrude outwardly away from base 41. When the animal deterrent device 12 is disposed on top external surface 57, animal deterring elements 42 extrudingly protrude outwardly away from top external surface 57. The array of animal deterring elements 42 is also dimensioned large enough to spread across a majority portion of base 41 so as to be effective to deter animals from overlying across top external surface 57. Base 41 defines through holes so that the animal deterrent device 12 is attachably secured to off-vehicle transducer 24 by fasteners 59 received in the through holes. The fasteners may include screws, nuts and bolts, rivets, and the like. Alternately, the base of the animal deterrent device may be secured to the top external surface using an adhesive. When the off-vehicle transducer 24 is secured on ground surface 28, top external surface 57 and base 41, respectively, are generally parallel with ground surface 28 and array of animal deterring elements 42 extend outwardly away from base 41 and top external surface 57 about transverse with ground surface 28. Alternately, the posts in the array may have a small angular disposition that differs from the perpendicular position.

Array of animal deterring elements 42 are extending cylindrical pins, or posts 44. Posts 44 generally extend in a direction perpendicular to base 41. Posts 44 are formed of uniform, solid material throughout. Preferably, posts 44 and base 41 are formed of the same material. Alternately, the posts may be hollowed out to advantageously allow less material to be used to fabricate the animal deterrent device while also reducing manufacturing material costs. Each post 44 has a circular, column form. Alternately, the posts may have a tapered shape becoming narrower as the post extends further remotely away from the base of the animal deterrent device. Having tapered posts is advantageous when molding the animal deterrent device to facilitate removal of the animal deterrent device from the mold. Each post 44 includes an end 67 having a spaced relationship to base 41. In a one embodiment, each post may have a 7 millimeter (mm) thickness adjacent the base which linearly tapers to a 4 mm thickness at the end. Each post 44 does not make physical contact with any other adjacent post 44 in the array of animal deterring elements 42. Optimally selecting the x-direction and y-direction distance between each post in the array may allow for less material to be used to fabricate the animal deterrent device while decreasing fabrication costs. Additionally, posts spaced far enough apart allow for easier periodic cleaning of the animal deterrent device especially the base of the animal deterrent device by a human operator of the charging system. The array of animal deterring elements 42 is a 6 by 7 deterring element array with the 7 elements in the array being proximate a left facing side wall 25 of off-vehicle transducer 24. Alternately, the size of the array may be any size as necessary to fit the size or shape of the top external surface. The non-contacting posts 44 are spaced apart by a distance in an x-direction and a distance in a y-direction. The y-direction distance is transverse to the x-direction distance and the x-direction distance and y-direction distance are generally parallel to ground surface 28. The distances of the x-direction and the y-direction are selected to prevent an animal from squeezing within the spaces in-between the posts in the array.

The x-direction distance and the y-direction distance are selected based upon the physical size of an animal's head and/or portions of the animal's body that is desired for deterrence from overlying the off-vehicle transducer or in-between the adjacent posts. Generally, an animal that cannot fit a head through the posts will not also attempt to fit the torso or the remainder of the body also in-between the posts. Preferably, the x-direction distance and the y-direction distance are respectively sized to keep out the head of a small cat from fitting in-between adjacent posts in the array of animal deterring elements. Even more preferably, it has been observed that the x-direction distance and the y-direction distance should be about the same distance. It has been also been observed that the x-direction distance and the y-direction distance that is effective to deter animals, especially dogs and cats, may be in a range from about 4 cm to about 7 cm. For example, a 5 cm spacing of each post in the array in both the x-direction and the y-direction may provide sufficient inter-post spacing to keep a small cat's head and/or body and/or torso from residingly overlying the transducer and from fitting in-between the posts. In an alternate embodiment, tapered posts may also have 5 cm spacing in both the x-direction and the y-direction as measured between the posts adjacent the base of the animal deterrent device.

The animal deterrent device 12 is formed of a dielectric material. Preferably, the animal deterrent device is formed of a plastic material, such as nylon or a thermoplastic. Alternately, the animal deterrent device and the top portion of the housing of the off-vehicle transducer may be formed from the same material. Even more preferably, the base and the array of animal deterring elements are formed from the same dielectric material. Posts 44 are configured to have a sufficient amount of stiffness, or rigidity to provide column strength for posts 44 to project outwardly upward from base 41 and to prevent at least the ingress of animals thereto while also having a sufficient amount of flexibility and resilience to resist breakage under normal operation. For example, breakage of at least the animal deterring elements of the animal deterrent device may occur if at least a portion of human body weight or a portion of the vehicle's mass is applied against the posts of the animal deterrent device.

Figure 5:
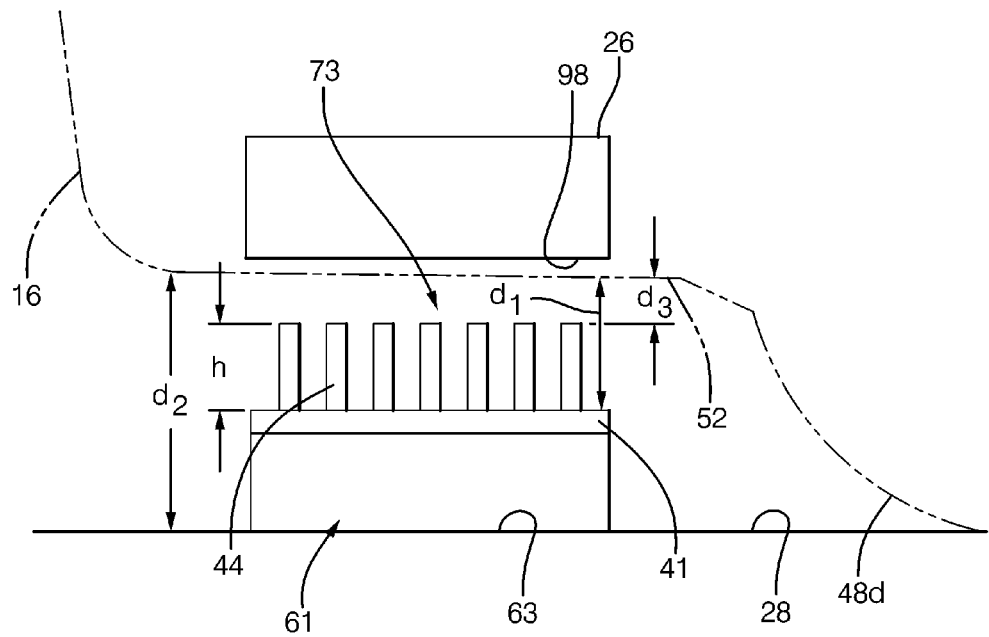
FIG. 5 shows a magnified view of distance relationships between the animal deterrent device/off-vehicle transducer and the on-vehicle transducer of the electrical charging system of FIG. 4.

Referring to FIGS. 3-5, the relationship of the off-vehicle transducer 24 that includes the animal deterrent device 12 and on-vehicle transducer 26 is better illustrated. A length L of vehicle 16 is disposed along a longitudinal axis A. Vehicle 16 is positioned, so that when parked, on-vehicle transducer 26 has a spaced relationship with, and substantially axially overlies the off-vehicle transducer 24 along a longitudinal axis B. Axis B is generally disposed transverse to axis A, as best illustrated in FIG. 4. Referring to FIG. 5, vertical distances $d_1$, $d_2$, $d_3$, and a height h of posts 44 are illustrated. Distances $d_1$, $d_2$, $d_3$, and a height h are all axial distances in relation to axis B. Distance $d_2$ is a greater distance than distances $d_1$, $d_3$ and height h, respectively. Distance $d_1$ is a distance from base 41 of the animal deterrent device 12 to chassis, or undercarriage 52 of vehicle 16. Distance $d_2$ is a distance from ground surface 28 to undercarriage 52 and distance $d_3$ is from ends 67 of posts 44 to undercarriage 52. Distance $d_3$ identifies a volumetric space 73 intermediate undercarriage 52 and ends 67 of posts 44 of the animal deterrent device 12. Height h is measured from base 41 to ends 67 of posts 44 of the array of animal deterring elements 42. Preferably, height h is the same height for every post 44 in the array of animal deterring elements 42. Distance $d_2$ generally defines a ground clearance space intermediate undercarriage 52 and a generally planar ground surface 28. The ground clearance space is about the same distance $d_2$ along length L of vehicle 16, as best illustrated in FIG. 4. Another definition for ground clearance may be the amount of space between the lower most hanging part of the vehicle's undercarriage and the flat ground surface. The animal deterrent device 12 is effective to keep animals out of space 73 when undercarriage 52 overlies the animal deterrent device 12 disposed on off-vehicle transducer 24, especially when on-vehicle transducer 26 directly overlies off-vehicle transducer 24. The animal deterrent device 12 is also effective to keep animals from being disposed in the spaces disposed in-between posts 44 of the array of animal deterring elements 42 within height h across base 41 along top external surface 57. A height of the off-vehicle transducer may also need to be taken into consideration for the correct sizing of the height of the animal deterring elements in any application of use for the animal deterrent device. In some other alternate embodiments, a lower surface of the on-vehicle transducer may hang below a lower surface of the undercarriage so as to have a distance from the ground surface that may be less than $d_2$. In this type of application, the animal deterring elements of the animal deterrent device are sized to ensure that when at least a portion of the transducers overlie one another animals are prevented from at least entering this space in-between the transducers.

On-vehicle transducer 26 is mounted on vehicle 16 in a manner so that a planer external surface 98 of on-vehicle transducer 26 is generally level with a lower external surface of undercarriage 52. Alternately, the external surface of the on-vehicle may be non-planar. The lower surface of the undercarriage is that surface that is located closest to the ground surface generally along length L of vehicle 16. Alternately, on-vehicle transducer 26 may be recessed within undercarriage 52 so that the lower external surface of the on-vehicle transducer may be disposed at a distance greater than distance $d_2$. The distances in the x-direction and the y-direction of the posts of the animal deterrent device are disposed about, and perpendicular to axis B. As best illustrated in FIG. 4, vehicle 16 is positioned by the operator 54 so that on-vehicle transducer 26 substantially axially overlies the off-vehicle transducer 24 along axis B. The operator 54 uses alignment means 36 which includes a wheel chock 46 to assist at arriving of the correct positioning of vehicle to ensure substantial alignment of transducers 24, 26. Wheel chock 46 is positioned so that tire 48b of vehicle 16 engages wheel chock 46. Alternately, a wheel chock may be used at one or more of the tires 48b, 48d (other tires not shown) of vehicle 16. Wheel chock 46 may be formed from any type of solid material such as plastic, wood, or metal. For example, the wheel chock may be commercially available for purchase at an auto supply store. In many embodiments, the human driver may also be the human operator that governs operation of the charging system. Still alternately, the off-vehicle transducer may not completely underlie the off-vehicle transducer, yet still be effectively positioned one-to-another to communicate magnetic energy therebetween. In some other alternate embodiments, the off-vehicle transducer may not underlie the on-vehicle transducer, yet still underlie the undercarriage of the vehicle and yet still be effectively to transmit/receive magnetic energy one-to-another. Alternately, the driver may utilize other alignment techniques/technologies that allow for alignment of the transducers to ensure optimum system efficiency of the charging system.

Height h of posts 44 along with x-direction and y-direction spacing of posts 44 need to be selected and fabricated dependent on the vehicle application of use so that animals are deterred from entering space 73 or other spaces defined in-between posts 44 within height h. When on-vehicle transducer 26 is mounted on vehicle 16, as illustrated in FIG. 5, with external surface 98 being level with or recessed axially away from a lower surface of undercarriage 52, distance $d_3$ is maintained across length L of vehicle 16. Preferably, distance $d_3$ and the x-direction distance are about the same distance dimension and the y-direction distance is about the same distance dimension as the x-direction. This same distance relationship ensures that posts 44 of the animal deterrent device 12 have sufficient height to advantageously deter animals from residing in space 73, especially the animal's head or at least a portion of the animal's body, or torso. In an alternate embodiment, if the on-vehicle transducer is attached to the undercarriage so as to protrudingly extend below the lower surface of the undercarriage along length L so that the lower external surface of the on-vehicle transducer is disposed closer to the ground surface, the height of the posts would need to be effectively sized in relation to the protruding on-vehicle transducer. As described above and also preferably in this alternate embodiment, the distance $d_3$ and the x-direction distance are about the same dimension and the y-direction distance is about the same as the x-direction distance. Again, this same distance relationship ensures if the on-vehicle transducer substantially overlies the off-vehicle transducer, at least the head and the body of the animal is prevented from being disposed in the space intermediate the ends of the posts and the on-vehicle transducer and the spaces defined in-between the posts. For example, distance $d_2$ may be in a range from about 10 cm to about 25 cm for a vehicle as previously described in the Background herein, and distance $d_3$ may be about 2 cm less than the $d_1$ distance. The appropriate height h for the posts, then, may be ascertained, or determined. It has been observed that $d_3$ being about 2 cm less than the selected $d_1$ distance may be sufficient clearance for the vehicle to be positioned so as to easily overlie the animal deterrent device, but small enough so that an animal would not gain access to the space intermediate the animal deterrent device and the on-vehicle transducer. Advantageously, the posts have sufficient height so as to effective fill the space intermediate the transducers 24, 26 yet remain obstructingly free from making contact with the undercarriage within the ground clearance of the vehicle during normal operation of the vehicle and the animal deterrent device. Alternately, trucks may require distance $d_2$ that has a range that is greater than 25 cm as trucks generally have an increased ground clearance in contrast to that of a vehicle.

Figure 6:
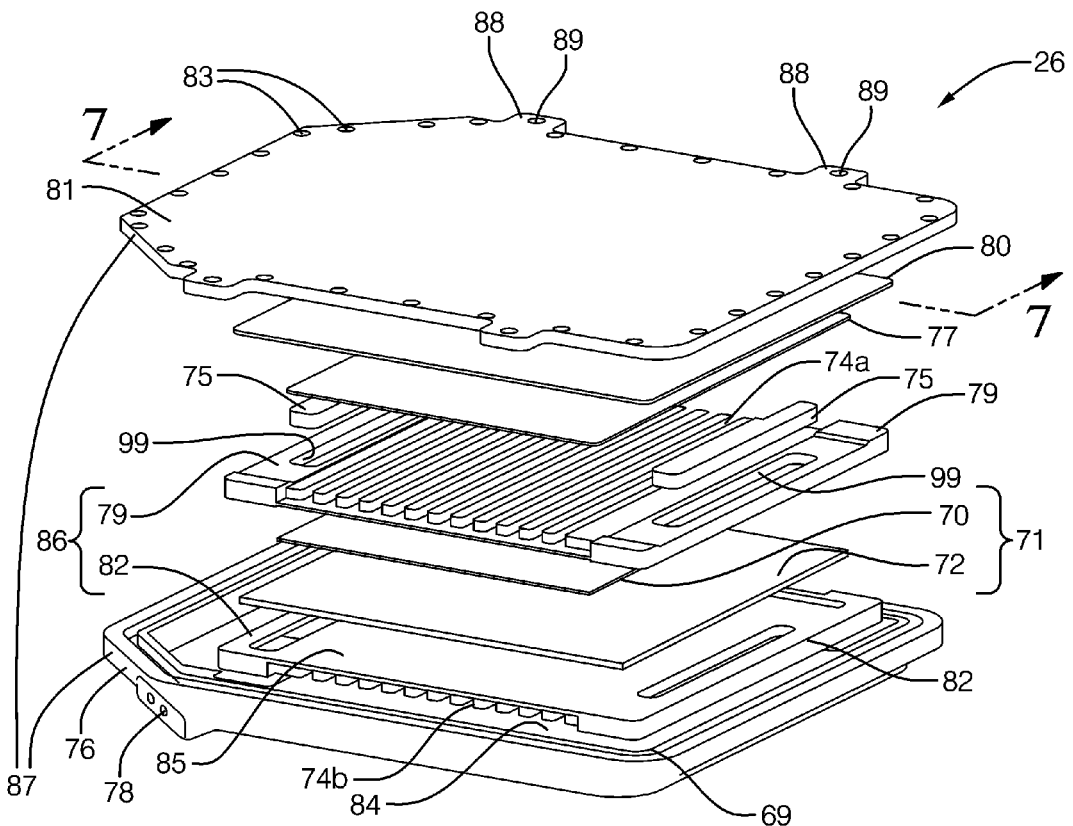
FIG. 6 shows an exploded view of the on-vehicle transducer of FIG. 5.
Figure 7:
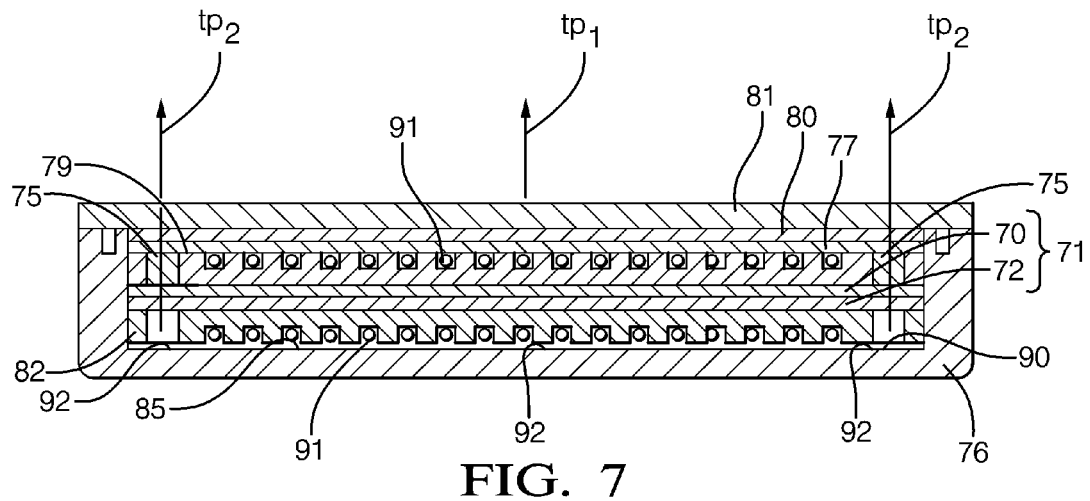
FIG. 7 shows a cross-section view of the on-vehicle transducer of FIG. 6.

Referring to FIGS. 6-7, an exploded view and a cross-section view of on-vehicle transducer 26, respectively, is illustrated. A top ferrite housing portion 79 and a bottom ferrite housing portion 82 combine together to form a first housing 86. Top and bottom ferrite housing portions 79, 82 are formed of a dielectric material, such as a plastic material that is formed by injection molding by any known method used in the injection molding art. Top and bottom ferrite housing portions 79, 82 are identically formed so as to decrease manufacturing costs. Alternately, the portions of the first housing may have different constructions and still be attachable together to form the first housing. A cover 81 is configured for attachment to cavity portion 76 to form a second housing 87. Preferably, cover 81 is formed of a metal material. More preferably, cover 81 is formed of aluminum or an aluminum alloy metal material. Aluminum has a lower mass than other metals, such as copper, and is preferred when the transducer is used for mounting on a vehicle. Aluminum is also thermally-conductive and has the necessary strength used to mount on-vehicle transducer 26 to vehicle 16. In contrast, cavity portion 76 of second housing 87 is formed of a dielectric material. Preferably, cavity portion 76 is formed of the same plastic material used to form the top and bottom ferrite housing portions 79, 82 of the first housing 86. Alternately, the dielectric material used to form the cavity portion may be different than the dielectric material used to form the portions of the first housing. Still alternately, the cover and the cavity portion may both be formed from a dielectric material. In yet another alternate embodiment, the cover and the cavity portion may both be formed from a non-dielectric material. Cover 81 attaches to cavity portion 76 using fasteners (not shown) disposed in openings 83 defined along a perimeter of cover 81 that are received in other openings (not shown) defined in cavity portion 76. For example, the fasteners may be threaded bolts. Alternately, the fasteners may be screws or an adhesive. Thus, when on-vehicle transducer 26 is fully assembled, first housing 86 is disposed within second housing 87. In another embodiment, the aluminum cover may additionally provide for a stable ground plane for the on-vehicle transducer when secured to the vehicle. Additionally, tabs 88 extend away from an edge of cover 81 and define other openings 89 so that other fasteners may attach on-vehicle transducer 26 to a structure associated with vehicle 16. Such a structure may be a support frame (not shown) associated with undercarriage 52 of vehicle 16.

If a smaller sized on-vehicle transducer is required in an electrical application, ferrite layer 72 may similarly decrease which further increases the need to have thermal control to vent heat out of on-vehicle transducer 26. It is strongly desired to minimize the potential for an undesired thermal event to occur on the on-vehicle transducer when the on-vehicle transducer is mounted to the vehicle.

To this end, then, first housing 86 includes a coil arrangement 71. Coil arrangement 71 includes a ferrite layer 72 that overlies an internal surface 85 of bottom ferrite housing portion 82 along a majority portion of the surface area of bottom ferrite housing portion 82. In an alternate embodiment, the ferrite layer may have a thickness of 5 millimeters. In another alternate embodiment, the ferrite layer may be formed from four individual ferrite tiles. A soft, pliable, resilient, compressible thermally-conductive silicone layer 70 overlies ferrite layer 72 within first housing 86. In one embodiment, the thermally-conductive material has the consistency of chewing gum. Thermally-conductive silicone layer 70 also covers the majority portion of the surface area of bottom ferrite housing portion 82 similar to ferrite layer 72. Ferrite layer 72 and thermally-conductive silicone layer 70 are each cut to a sufficient size from respective sheets of commercially available flexible material when the on-vehicle transducer 26 is manufactured. Top and bottom ferrite housing portions 79, 82 sandwich the thermally-conductive silicone layers 70, 77 therebetween to form an assembled first housing 86. Top and bottom ferrite housing portions 79, 82 are attachable together by screws (not shown). In one embodiment, a pair of screws fastens the top ferrite housing portion 79 to the bottom ferrite housing portion 82 and another pair of screws further fastens the bottom ferrite housing portion 82 to the top ferrite housing portion 79. A wire conductor 91, preferably Litz wire, windingly surrounds first housing 86. The wire conductor 91 is disposed within a plurality of slotted grooves 74a, 74b defined in, and disposed along a respective length of the top and bottom ferrite housing portions 79, 82, as best illustrated in FIG. 7. First housing 86 and the wound wire conductor 91 is fittingly received in a cavity 84 of cavity portion 76. First housing 86 is fitted in cavity 84 so that an air gap layer 90 is formed intermediate first housing 86 and an internal surface of cavity portion 76. When on-vehicle transducer 26 is fully manufactured, as is shown in FIG. 4, air gap layer 90 becomes a static air gap in that air does not physically move within this space. Air gap layer 90 effectively prevents heat transfer out and away from cavity portion 76. Extended, raised feet 92 formed in cavity portion 76 assist to form air gap layer 90. Alternately, should a larger air gap layer thickness be desired, the feet thickness may be further extended. Still alternately, an air gap layer may not be employed.

The wire conductor 91 is formed from a plurality of wire conductors known as Litz wire. The wire conductor 91 may be secured to one or both of the top and bottom ferrite housing portions 79, 82 through holes (not shown) defined in one or both of the top and bottom ferrite housing portions 79, 82 using a strap fastener (not shown). Alternately, the wire conductor 91 may be held in place with an adhesive tape. The strap and/or adhesive tape ensure the wire conductor 91 does not become displaced from the first housing during handling of the housing in manufacturing. In one embodiment, the wire conductor 91 is a Litz wire that includes 4,500 individual wire conductors that are bundled together. Both ends of the wire conductor 91 may electrically connect with a printed circuit board (PCB) (not shown) disposed within the second housing of the on-vehicle transducer.

A molded silicone-based seal (not shown) is configured to reside in groove 69 defined in cavity portion 76. Preferably, the silicone-based molded seal is formed as a single continuous piece having no breakage or discontinuity. The silicone-based seal may have a continuous circular form, or shape prior to being disposed in a groove 69 having an aperture defined therethrough. The silicone-based seal is further compressed in groove 69 when cover 81 is secured to cavity portion 76 in a manner that keeps out contaminants, such as dust, dirt, water, out of the environment enclosed by second housing 87. If contaminants penetrate into the second housing of the on-vehicle transducer, operational performance of the on-vehicle transducer may undesirably degrade and may shorten the service life of the on-vehicle transducer.

In another embodiment, a printed circuit board (PCB) (not shown) is disposed within the second housing and includes a plurality of capacitors configured to be electrically charged so as to energize the coil arrangement so that optimum power efficiency of the charging system 10 is attained. In one embodiment, upwards of twenty capacitor devices may be disposed on the printed circuit board. Disposing the capacitors/PCB within the second housing further ensues the high voltage transmitted and carried by these electrical components is not accessible to pets or the human operator so that the safety afforded by the charging system 10 is increased. The ferrite layer of the first housing electrically connects with at least one of the capacitors in the plurality of capacitors to form a tuned electrical circuit. Alternately, that PCB may be disposed external to the second housing of the on-vehicle transducer. Other wire conductors, or cables may electrically connect with the PCB and be routed out openings 78 defined in first housing 76 to electrically connect with other electrical/electronic devices of the charging system 10, such as with the signal shaping device 32. Litz wire is especially useful in high frequency AC, high power applications and is known in the electrical wiring arts. The Litz wire conductors may be terminated in ring terminals or another type of fastener and be soldered thereto. The soldered ring terminals may then be fastened to the PCB with a fastener such as a bolt and a nut. The PCB that contains the plurality of capacitors may be manufactured on an assembly line as is known in the PCB arts.

Top ferrite housing portion 79 of first housing 86 also includes a pair of housing structures, or housing portions 75 that are formed from a different material than the first housing 86. Top ferrite housing portion 79 defines a pair of opposing elongate openings 99 proximate an edge of the perimeter of top ferrite housing portion 79 that are configured to receive housing portions 75. Preferably, housing portions 75 are formed from a unitary piece of continuous solid material throughout and has rectangular three-dimensional form. More preferably, housing portions 75 are formed from a metal material. Even more preferably, the metal material is a copper or a copper alloy material. Alternately, the housing portion may have any shape. Housing portions 75 are easily dropfitted in to, and received by openings 99 so that an external surface of housing portions 75 make direct contact with thermally-conductive silicone layer 70. Alternately, the housing portions may be formed of aluminum material. The housing portions formed of copper material provide greater heat transfer than if the housing portions are made of aluminum. Ferrite layer 72 is sufficiently sized so that openings 99 also overlie ferrite layer 72.

Another thermally-conductive silicone layer 77 is disposed external to first housing 86 to overlie a majority portion of first housing 86 and another external surface of respective housing portions 75. Thermally-conductive silicone layer 77 is formed of the same material as thermally-conductive silicone layer 70. Thus, thermally-conductive silicone layer 77 is disposed intermediate first housing 86 and an internal surface of cover 81 such that two distinct thermally-conductive silicone layers 70, 77 are disposed within second housing 87. A non-dielectric, or metal layer 80, preferably formed from copper or copper alloy overlies thermally-conductive silicone layer 77 and is suitable as a ground plane to enhance magnetic field performance operation of on-vehicle transducer 26. Alternately, the metal layer may be some other metal material that is different from the copper or copper alloy material.

Thermally-conductive silicone layers 70, 77 and the housing portions 75 advantageously serve to judiciously vent heat out from first and second housings 86, 87 of on-vehicle transducer 26. There is generally a first main thermal heat dissipation path $tp_1$ and a second main thermal heat dissipation path $tp_2$ for heat ventilation and transmission out from first and second housings 86, 87 of on-vehicle transducer 26, as best illustrated in FIG. 7. Both heat dissipation paths $tp_1$ and $tp_2$ are directionally transverse to an internal surface of cavity portion 76 of second housing 87. Air gap layer 90 advantageous generally prevents heat transfer through cavity portion 76. Thermal dissipation path $tp_1$ transfers heat that is centrally generated from the excitation of ferrite layer 72 in first housing 86. As ferrite layer 72 heats up during transducer operation, the generated heat within first housing 86 is thermally collected and/or absorbed by thermally-conductive silicone layer 70. As the heat permeates the top ferrite housing portion 79 of first housing 86, the other thermally-conductive silicone layer 77 further collects/absorbs the heat and transfers this absorbed heat to metal layer 80 and cover 81 so heat is transmitted out therefrom to the air environment surrounding cover 81. Second main thermal heat dissipation path $tp_2$ occurs through the housing portions 75 along the perimeter edge of first housing 86. As housing portions 75 physically and thermally directly connect with thermally-conductive silicone layers 70, 77, housing portions 75 advantageously assist to movingly transfer large amounts of heat in a direction towards metal layer 80 and cover 81 for dissipation in to the surrounding air environment adjacent on-vehicle transducer 26. It has been observed that the second thermal heat dissipation path $tp_2$ at the perimeter edge transfers more heat out from on-vehicle transducer 26 than the centralized first thermal heat dissipation path $tp_1$.

Figure 8:
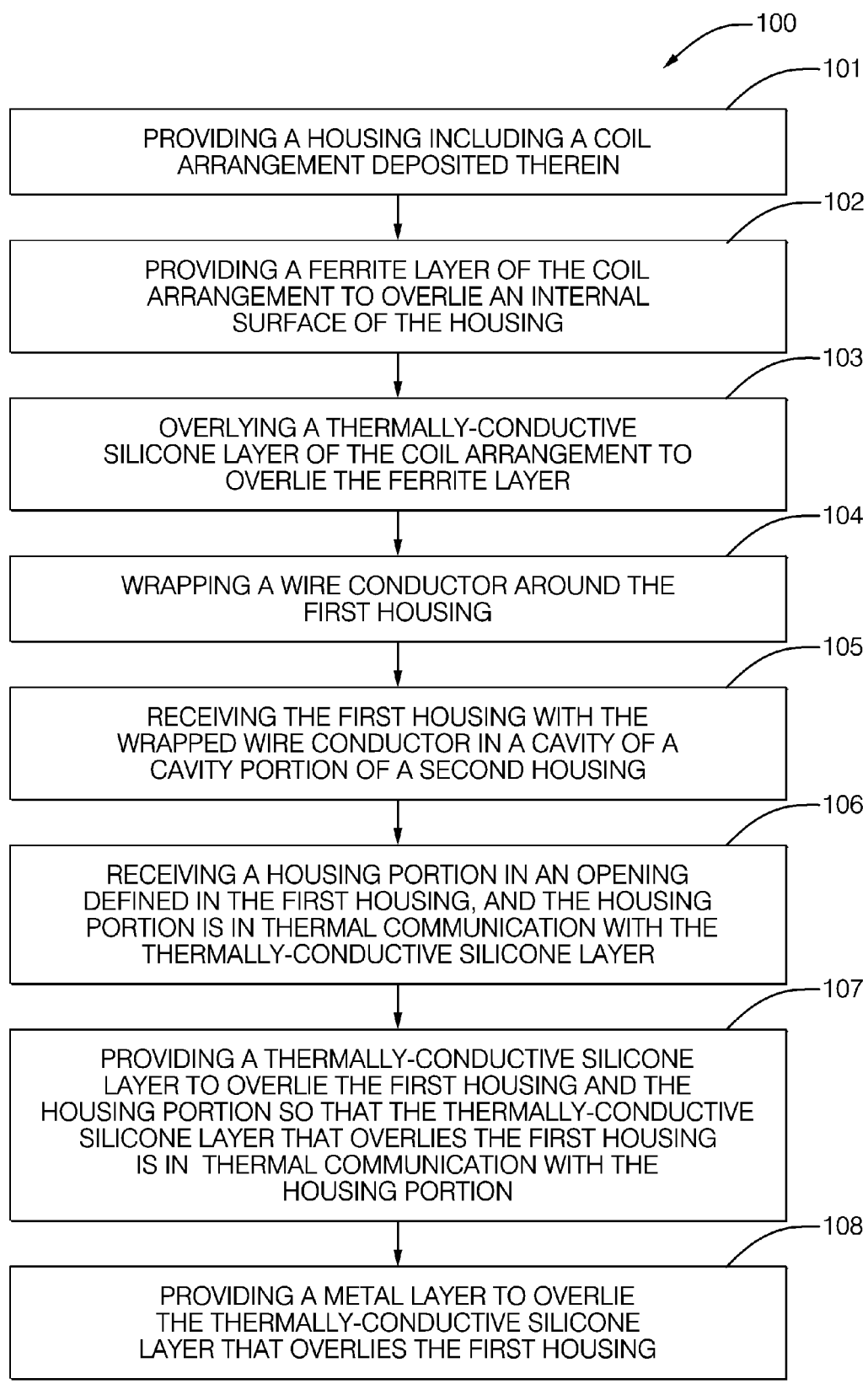
FIG. 8 shows a method of fabricating the on-vehicle transducer of FIG. 6.

Referring to FIG. 8, a method 100 to manufacture on-vehicle transducer 26 is presented. One step 101 in method 100 is providing a first housing 86 including coil arrangement 71 disposed therein. Another step 102 in method 100 is providing ferrite layer 72 of coil arrangement 71 to overlie an internal surface 85 of first housing 86. A further step 103 in method 100 is providing thermally-conductive silicone layer 70 of coil arrangement 71 to overlie ferrite layer 72. Another step 104 in method 100 is wrapping wire conductor 91 around first housing 86. A further step 105 in method 100 is receiving first housing 86 with wrapped wire conductor 91 in cavity 84 of a cavity portion 76 of second housing 87. Another step 106 in method 100 is receiving housing portions 75 in to openings 99 defined in first housing 86 so that housing portions 75 are in thermal communication with thermally-conductive silicone layer 70. A further step 107 in method 100 is providing another thermally-conductive silicone layer 77 to overlie first housing 86 and housing portions 75 of first housing 86 so that thermally-conductive silicone layer 77 is also in thermal communication with housing portions 75. Another step 108 in method 100 is providing metal layer 80 to overlie thermally-conductive silicone layer 77. Cover 81 is secured to cavity portion 76 of second housing 87 so as to compressingly hold the other pieces, or elements of on-vehicle transducer 26 in place. Additional fasteners, other than what has been described previously herein, are generally not needed to hold the individual elements, such as housing portions 75 or thermally-conductive silicone layer 77 in place. Cavity portion 76 and cover 81 are produced to incorporate tolerance stack up of coil arrangement 71 in combination with thermally-conductive silicone layer 77 and metal layer 80. Thermally-conductive silicon layer 77, being flexibly resilient, also advantageously assists to flexibly compress and hold coil arrangement 71, thermally-conductive silicone layer 77, and metal layer 80 in place in the assembled on-vehicle transducer 26. Not using the additional fasteners to secure the other layered elements of on-vehicle transducer may desirably save on labor costs to manufacture on-vehicle transducer 26 and also advantageously assist to keep the mass of the on-vehicle transducer low. On-vehicle transducer 26 may be manufactured using an automated manufacturing assembly processes or also by human operator. Openings 99 may also assist a human operator to ensure the thermally-conductive silicone layers are aligned correctly during manufacture of on-vehicle transducer 26.

The animal deterrent device 12 is generally not being used in the charging system 10 when the animal deterrent device 12 is not attached to off-vehicle transducer 24. The animal deterrent device 12, when attached with off-vehicle transducer 24, is generally not in use if off-vehicle transducer 24 is not secured to ground surface 28 and/or if off-vehicle transducer 24 is not in electrical connection with power transmitter 30. Off-vehicle transducer 24 and/or on-vehicle transducer 26 are not in use when not electrically connected in the charging system 10. Off-vehicle transducer 24 and/or on-vehicle transducer 26 are also not in use when electrically connected within the charging system 10, but the charging system 10 is not being used to pass energy through transducers 24, 26.

Off-vehicle transducer 24 and/or on-vehicle transducer 26 is partially in use when electrically connected in the charging system 10 and the charging system 10 is ready to electrically charge the battery 14, but is prevented from doing so. For example, this may occur if vehicle charger 34 prevents charging system 10 from electrically charging the battery 14.

Off-vehicle transducer 24 and on-vehicle transducer 26 are in use when electrically connected in the charging system 10 and the charging system 10 is electrically charging the battery 14. A majority portion of energy wirelessly received by on-vehicle transducer 26 from off-vehicle transducer 24, when in use, is through dielectric cavity portion 76 of on-vehicle transducer 26. Dielectric cavity portion 76 generally faces the animal deterrent device 12 of off-vehicle transducer 24 when transducers 24, 26 are in use.

Figure 9:
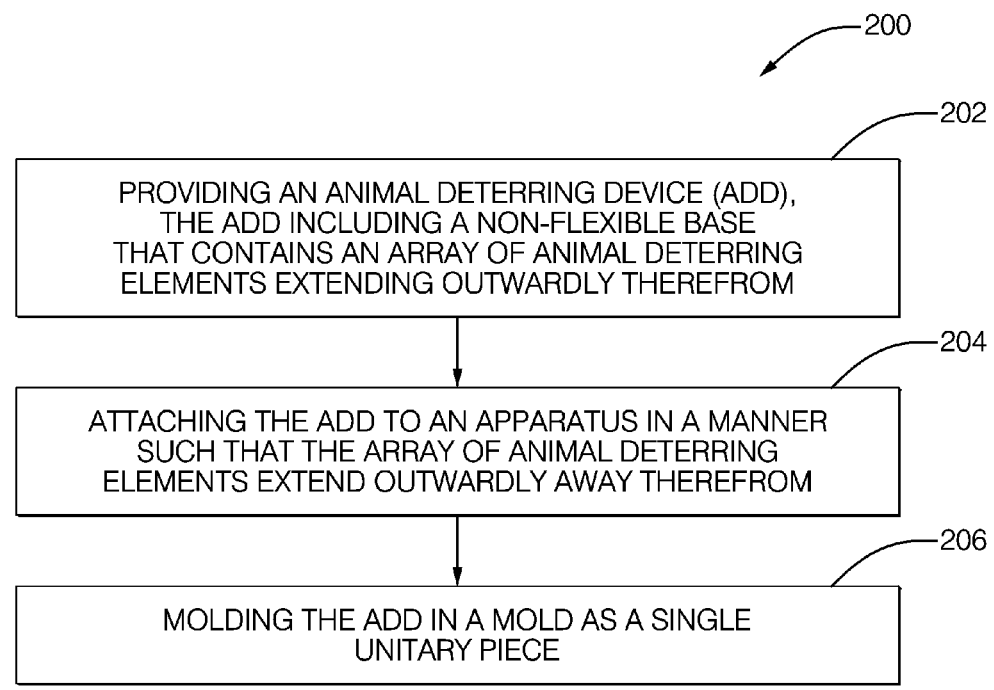
FIG. 9 shows a method of using the animal deterrent device associated with the electrical charging system of FIG. 4.

Referring to FIG. 9, a method 200 more particularly captures when the animal deterrent device 12 is being used in the charging system 10. One step 202 in method 200 is providing the animal deterrent device 12. The animal deterrent device 12 includes uniform, non-yielding base 41 that contains array of animal deterring elements 42 extending outwardly therefrom. Another step 204 in method 200 is deploying the animal deterrent device 12 on off-vehicle transducer 24 in a manner such that the array of animal deterring elements 42 extends outwardly away therefrom. While the animal deterrent device 12 is now functional, the animal deterrent device 12 is more useful once off-vehicle transducer is electrically connected to power transmitter 30 and power transmitter connected to power source 18. The animal deterrent device is best used to discourage animals especially when off-vehicle transducer is operational to transmit magnetic energy. Providing step 202 further includes step 206 of method 200 which is molding the animal deterrent device 12 in a mold so that base 41 and array of animal deterring elements 42 are formed as a unitary piece in a single mold operation in a manufacturing assembly process.

Figure 10:
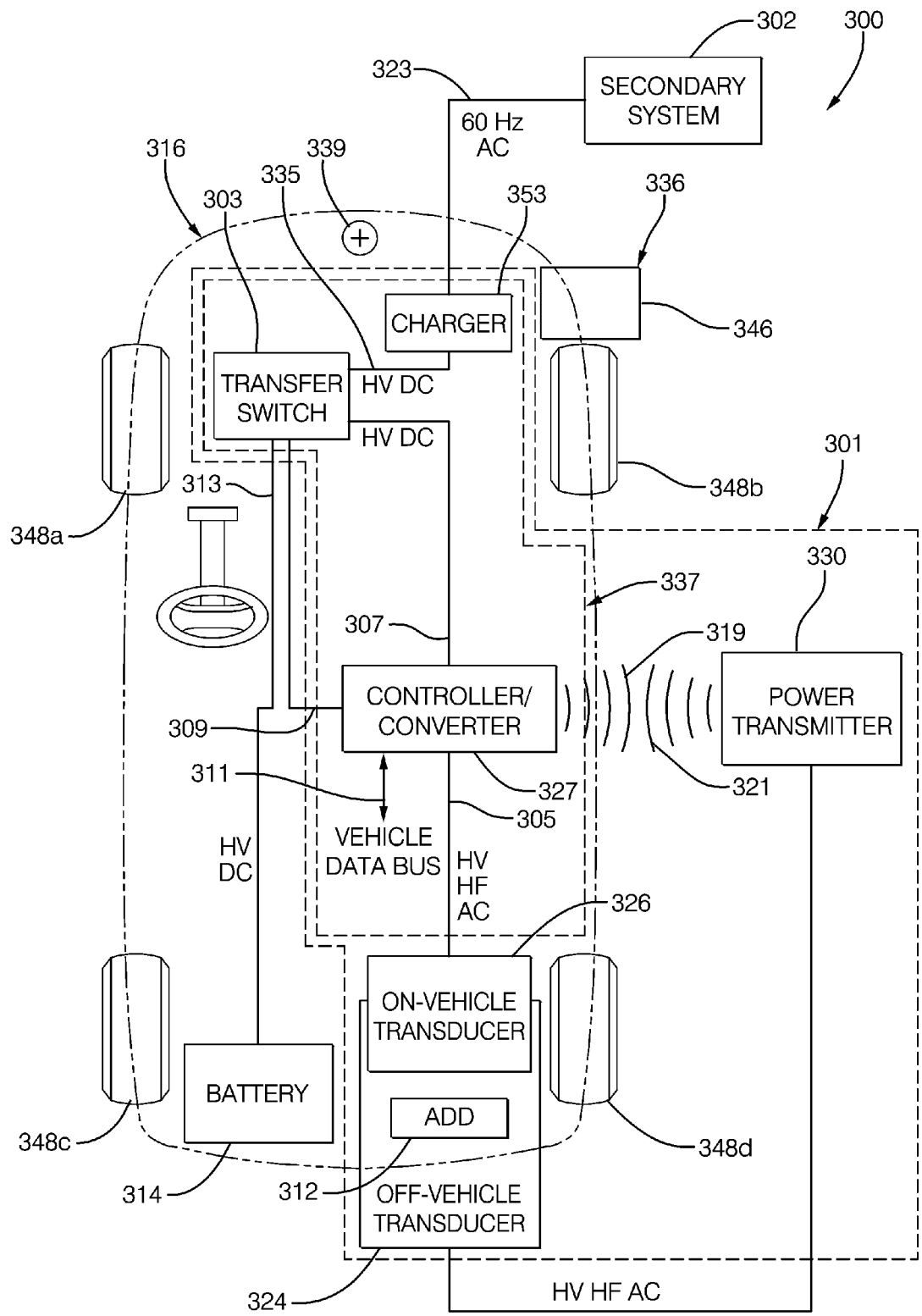
FIG. 10 shows an electrical charging system to electrically charge an energy storage device disposed on a vehicle that includes a primary charging system and a secondary charging system in which the primary charging system contains the on-vehicle transducer of FIG. 6, according to an alternate embodiment of the invention.

Referring to FIG. 10, yet another embodiment of the invention a charging system 300 includes a primary charging system 301 and a secondary charging system 302. Primary charging system 301 is generally a high voltage, high frequency charging system and secondary charging system is generally a lower voltage, lower frequency charging system. Primary charging system 301 includes an animal deterrent device 312 and an on-vehicle transducer 326 that may have any of the advantageous features in the embodiments previously described herein.

To better understand the electrical signals as designated on the electrical signal paths illustrated in FIG. 9, the following definitions apply:

60 Hz AC—A 60 Hz, AC voltage electrical signal. Generally, the AC voltage is either 120 VAC or 240 VAC dependent on the power source generating the voltage.

HV HF AC—A high voltage, high frequency alternating current (AC) electrical signal. Preferably, the voltage signal is greater than 120 VAC and the frequency of the voltage signal is greater than 60 Hz. The frequency may be in a range of 10 kHz to 450 kHz.

HV DC—A high voltage, direct current (DC) electrical signal. Preferably, the DC voltage is greater than 120 VDC.

Primary charging system 301 contains an the signal shaping device 337 and an integrated charger 353 that is different from the signal shaping device 32 and the vehicle charger 34 of the charging system 10 in the embodiment of FIG. 2. More particularly, the signal shaping device 337 includes a controller/convertor 327. A transfer switch 303 is in downstream electrical communication from controller/converter 327 via electrical output 307. Transfer switch 303 is also in downstream electrical communication with integrated charger 353 via signal path 335. Transfer switch 303 is in direct electrical communication with battery 314 via electrical output 313. There is no wireless volt meter electrical device (not shown) or ballast resistor electrical device (not shown) or inverter electrical device (not shown) in contrast with the charging system 10 in the embodiment of FIG. 4. The functionality of the wireless voltmeter is integrated in with the controller portion of controller/converter block 327. Thus, with the charging system 300, primary charging system 301 is a more simplified charging system approach that may allow for greater charging system power efficiency improvements. The charging system 300 may also allow for a more precise control in the electrical charging of battery 514. Alternately, the controller portion of the controller/convertor may electrically communicate with the integrated charger when the integrated charger is included as part of the primary charging system.

Primary charging system 301 operates with high voltages at a frequency that is greater than 60 Hertz (Hz). Secondary charging system 302 operates at a frequency of 60 Hz or less. A first frequency of a first electrical current input along signal path 305 to controller/convertor 327 of primary charging system 301 has a greater frequency value than a second frequency of a second electrical current carried on output 323 from secondary system 302 to integrated charger 353. An electrical signal output from integrated charger 353 is received by transfer switch 303. Controller/convertor 327 may measure voltage, current and power similar to the embodiment of FIG. 4. Wireless signal paths 319, 321 transmit data to ensure charging system 301 operates at optimal system power efficiency. Signal path 309 operates the state of transfer switch 303. An extension of the alignment means presented in the embodiment of FIG. 4 may be a secondary aligning means, such as a tennis ball 339, to further assist to position vehicle 316 so that off-vehicle and on-vehicle transducers 324, 326 are in alignment so as to operationally perform the transfer of magnetic energy there between. Optimally, off-vehicle and on-vehicle transducers 324, 326 may generally be in physical, axial alignment similar to the embodiment of FIG. 4. Alternately, the transducers may not be in axial alignment and the primary charging system may still effectively operate. Wireless signal paths 321 may also transmit sensor data as described in the embodiment of FIG. 9 to electrical devices disposed on vehicle 316. Vehicle data bus 311 transmits vehicular information, such as the current charging level of battery 314 to controller/convertor 327. Secondary system 302 provides a 60 Hertz (Hz) electrical charging option for a human operator of the charging system 300 to advantageously provide further charging convenience for the human operator. Having a 60 Hz secondary system that may operate from a power source of 120 VAC and a greater than 60 Hz primary system that may operate from a power source of greater than 120 VAC provides different electrical charging options for the human operator that may be available dependent on where the vehicle is operated. One such secondary system is further described in U.S. Patent Application Publication 2012/0126747 which is the publication of U.S. patent application Ser. No. 12/950,298 entitled "BATTERY CHARGER HAVING NON-CONTACT ELECTRICAL SWITCH" filed on 19 Nov. 2010 and incorporated by reference in its entirety herein.

Figure 11:
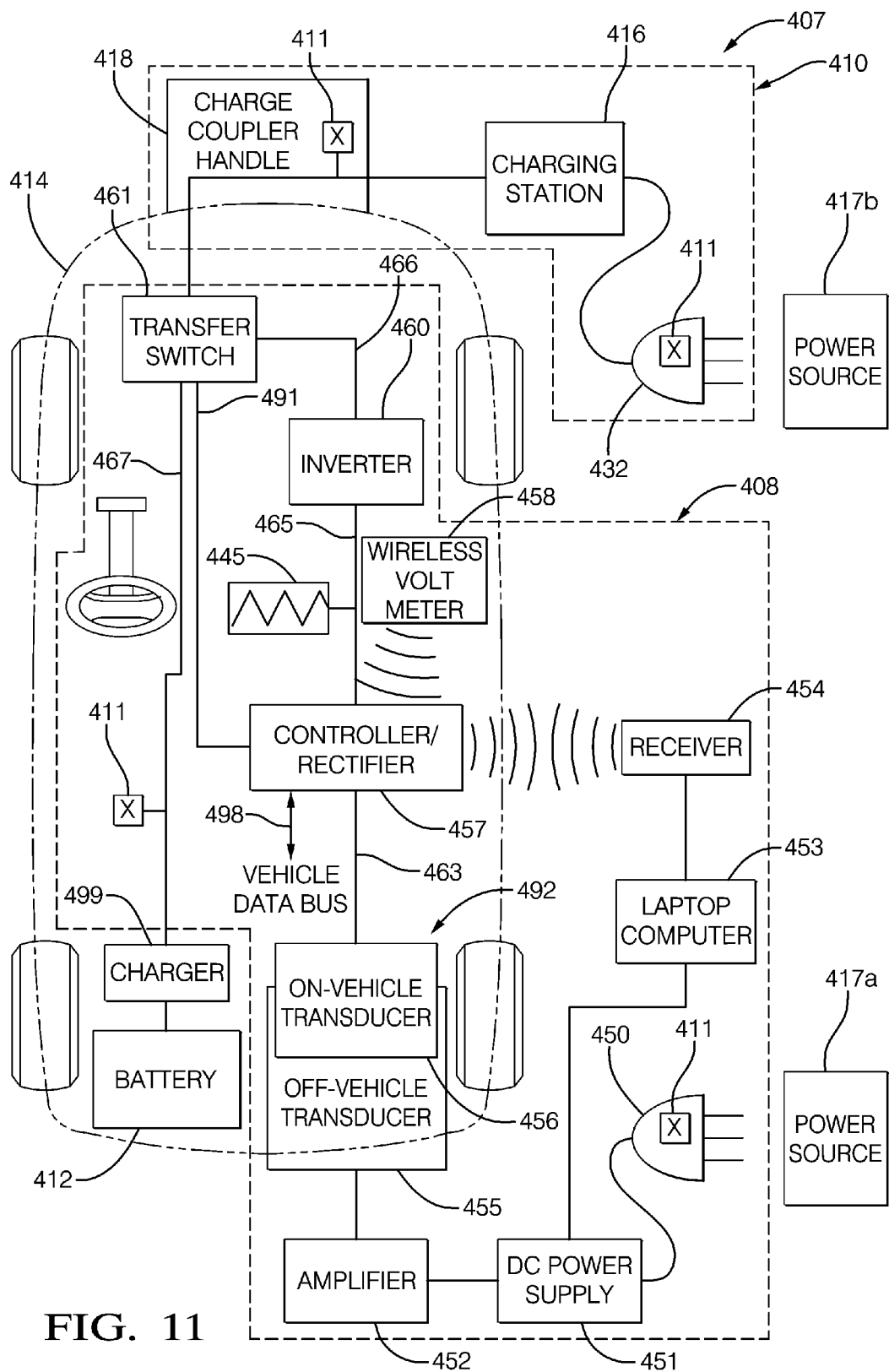
FIG. 11 shows a power safety system that includes a primary charging system and a secondary charging system that respectively electrical charge an energy storage device disposed on a vehicle in which the power safety system includes a plurality of thermally-triggered electrical breaking arrangements and the primary charging system contains the on-vehicle transducer of FIG. 6, according to another alternate embodiment of the invention.

Referring to FIG. 11, a power safety system (PSS) 407, according to another alternate embodiment of the invention, includes an on-vehicle transducer 456 that contains the ferrite layer and the thermally-conductive silicone layer as previously described herein. On-vehicle transducer 456 is configured to receive magnetic energy from off-vehicle transducer 455 where at least a portion of the received energy by on-vehicle transducer 456 is used to electrically charge energy storage device 412. The power safety system 407 contains a plurality of electrical charging systems 408, 410 that collectively contain a plurality of thermally-triggered electrical breaking arrangements 411. The charging system 408 is a primary charging system and the charging system 410 is a secondary charging system that is different from primary charging system 408. The primary and secondary charging systems 408, 410 are described in even further detail in U.S. Patent Application Publication 2013/0134933 which is the publication of U.S. patent application Ser. No. 13/306,327, entitled "POWER SAFETY SYSTEM AND METHOD HAVING A PLURALITY OF THERMALLY-TRIGGERED ELECTRICAL BREAKING ARRANGEMENTS," filed on Nov. 29, 2011, and incorporated herein in its entirety. Primary charging system 408 and secondary charging system 410 are respectively advantageously configured to electrically charge energy storage device, or battery 412 with electrical current. Battery 412 is disposed on vehicle 414. The power safety system 407 includes a first and a second and a third portion. Primary charging system 408 includes the first portion and the second portion. The first portion of primary charging system 408 is disposed external to vehicle 414 and the second portion is disposed on vehicle 414. The third portion of the power safety system 407 is secondary charging system 410. The first, second, and third portion of the power safety system 407 are described in further detail below under their respective headings.

Primary and secondary charging systems 408, 410 are constructed from any combination of electrical components as are used to form electronic circuitry, such as resistors, capacitors, inductors, diodes, integrated circuits (ICs), thermal cutout devices, relays, power supply ICs, magnetic or inductive devices, microprocessors, microcomputers, switches, relays, and the like. Electronic devices like battery 412 disposed on vehicle 414 and other electronic devices like power sources 417a, 417b disposed external to the power safety system 407 and vehicle 414. Battery 412 is also disposed external to primary and secondary charging systems 408, 410 of the power safety system 407. Primary charging system 408 is electrically powered by power source 417a and secondary charging system 410 is electrically powered by power source 417b. Respective plugs 432, 450 of primary and secondary charging systems 408, 410 releasably couple with electrical outlets (not shown) that may be found in a conventional garage. Alternately, electrical outlets may be provided in a location wherever a vehicle may be electrically charged, such as a parking lot or parking garage. Power source 417a that electrically powers primary charging system 408 is a 240 VAC power source and power source 417b that electrically powers secondary charging system 410 is a 120 VAC power source. Alternately, the primary and the secondary system may be powered by the same power source where the power source is 120 VAC or 240 VAC. In a further alternate embodiment, any AC voltage may be utilized for the power source for the primary and/or the secondary charging system that is effective to electrically charge the battery of the vehicle. Still yet alternately, the frequency of the power source for either the primary and/or secondary system may be 50-60 Hz. In another alternate embodiment, the primary system and/or secondary system may be respectively electrically hardwired to a power source of any voltage value such that the electrical outlets are not needed. Having one or more of the electrical systems being hardwired may be advantageous for the human operator in that less electrical hook-up is required by the human operator each time the primary or secondary system is needed for use. The human operator also does not need to handle the power safety system components electrically wired to the high voltage energy which may provide additional safety for the human operator.

Primary Charging System of the Power Safety System

The first portion of primary charging system 408 external to vehicle 414 receives energy from power source 417a, amplifies the received energy, and wirelessly transmits or propagates at least a portion of the amplified energy to the second portion of the primary charging system 408 disposed on vehicle 414. The second portion of primary charging system 408 receives and couples the propagated energy from the first portion of primary charging system 408 and electrically transforms the coupled wirelessly transmitted energy to electrical current that is subsequently used to electrically charge battery 412 of vehicle 414. The first portion of primary charging system 408 includes plug 450 coupled to a cord that attaches with a DC power supply 451, a computer 453, a receiver 454, an amplifier 452, and off-vehicle transducer 455. The second portion of primary charging system 408 attached to vehicle 414 includes on-vehicle transducer 456, a controller/rectifier 457, a ballast resistor 445, a wireless voltmeter 458, an inverter 460, a transfer switch 461, and a breaking arrangement 411 which is disposed proximate to battery 412 to protect a human operator (not shown) from one or more undesired thermal events that may occur proximate to primary and/or secondary charging systems 408, 410. The breaking arrangements 411, are electrically activated if thermally triggered when a temperature at the respective the breaking arrangement exceeds a predetermined threshold due to the thermal event. As illustrated in FIG. 11, another breaking arrangement 411 is disposed in plug 450 of primary charging system 408. Off-vehicle transducer 455 and on-vehicle transducer 456 form an energy coupling arrangement 492 that couples at least a portion of energy produced external to vehicle 414 and is propagated to vehicle 414 that is used to electrically charge battery 412. Energy coupling arrangement 492 may be formed as a plain inductive coupling arrangement, a magnetic coupling arrangement, or a wireless electrical coupling arrangement. Alternately, the controller/rectifier block may be disposed as separate, distinct functional blocks within the primary system. Computer 453 analyzes the received data from controller/rectifier 457 via receiver 454 and adjusts DC power supply 451 to ensure that an output of the rectifier portion of controller/rectifier 457 is within a range dependent on the electrical application of use for the primary charging system 408. Alternately, receiver 454 may also be used as a receiver/transmitter to communicate with charger 499 and/or the on-board vehicle portion of primary system 508 to ensure optimal electrical charging of battery 412. Controller/rectifier 457 may also receive/transmit data to/from charger 499 through vehicle data bus 498.

Initially, energy is supplied to the first portion by a 240 VAC power source 417a when plug 450 is coupled in the electrical outlet. The electrical outlet is an extension of power source 417a. The energy is received by a DC power supply 451 that produces a DC voltage that is modulated by amplifier 452 to become a high frequency AC voltage that is output from amplifier 452. The high frequency AC voltage output from amplifier 452 may be in range from 20 to 200 kilohertz supplied to off-vehicle transducer 455. Off-vehicle transducer 455 transmits this high frequency AC voltage signal that is received by on-vehicle transducer 456. On-vehicle transducer 456 of the second portion of the primary charging system 408 wirelessly receives and couples at least a portion of the amplified, high-frequency AC voltage and transmits this portion along signal path 463 to controller/rectifier 457. Controller/rectifier 457 electrically rectifies this voltage to produce a corresponding direct current (IDC). This IDC current is electrically transmitted along signal path 465 to invertor 460 that inverts the corresponding DC current to produce a 50-60 Hertz electrical current that is configured for use to electrically charge battery 412. The 50-60 hertz electrical current is transmitted along signal path 466 to transfer switch 461. When transfer switch 461 is set to a first state to allow primary charging system 408 to electrically charge battery 412 the 50-60 hertz signal is carried along signal path 467 to charger 499. Transfer switch 461 is selectably controlled by controller/rectifier 457 via control signal 491 to operatively control a state of transfer switch 461. When controller/rectifier 457 sets transfer switch 461 to the first state, the electrical current produced by primary charging system 408 is configured to electrically charge battery 412 as previously described above. When controller/rectifier 457 sets switch 461 to a second state through control signal 491 the secondary charging system 410 is configured to electrically charge battery 412. Alternately, the controller may set the transfer switch to a third state to allow both the primary and the secondary system to electrically charge the battery at the same time. Transfer switch 461 is in electrical communication with a charger 499 that regulates and controls the voltage that is useful to electrically charge battery 514. Charger 499 is used by electrical systems of vehicle 414 to allow independent control of battery charging independent of the power safety system 407. Thus, charger 499 may further modify or manage the electrical charging of battery 412 from electrical current received from the power safety system 407. Alternately, the functionality of the vehicle charger may be included as part of the power safety system. Still yet alternately, the vehicle charger may not be employed.

Controller/rectifier 457 communicates with a vehicle data bus 498. Alternately, the transfer switch may be controlled by another electrical device in the vehicle through the vehicle data communication bus. Vehicle data communication bus 498 may communicate status information to primary charging system 408 regarding the electrical hookup of secondary charging system 410. Primary charging system 408 may communicate information about primary charging system 408 to the vehicle on vehicle data communication bus 498. Wireless voltmeter 458 measures the magnitude of the voltage and/or electrical current at the output of controller/rectifier 457 along signal path 465. This voltage information is wirelessly communicated to receiver 454 in the first portion of primary charging system 408. Knowing the on-board vehicle voltage information allows for the variable adjustment of power supplied to off-vehicle transducer 455 by primary charging system 408 to optimize electrical operation of primary charging system 408. Ballast resistor 445 is used to minimize the magnitude of the voltage along signal path 465 during operational start-up of primary charging system 408. Alternately, the ballast resistor may not be used in the primary charging system. In one embodiment, the electrical current available to electrically charge the battery may be in an electrical current range of 10-20 amps. The primary and secondary charging systems 408, 410 may electrically charge battery 412 with the same amount of electrical current, but primary charging system 408 may electrically charge battery 412 in less time being supplied with power produced from the 240 VAC power source 417a versus secondary charging system 410 being supplied with power from the 120 VAC power source 417b. Alternately, the breaking arrangement proximate the battery disposed in the vehicle may not be employed. In still another alternate embodiment, the breaking arrangement in the either of the plugs may not be employed. In a further alternate embodiment, the primary charging system may not use plug 450 and otherwise be hardwired to a power source such that the breaking arrangement used with plug 450 may not be utilized. This type of signal shaping device configuration along with other signal shaping device configurations are further described in U.S. Patent Application Publication 2013/0015812 which is the publication of U.S. patent application Ser. No. 13/450,881 entitled "ELECTRICAL CHARGING SYSTEM HAVING ENERGY COUPLING ARRANGEMENT FOR WIRELESS ENERGY TRANSMISSION THEREBETWEEN" filed on 19 Apr. 2012 which is incorporated by reference in its entirety herein.

Secondary Charging System of the Power Safety System

Secondary charging system 410 includes a charging station 416 and a charge coupler handle 418 and is configured to supply 50-60 hertz electrical current to battery 412 when at least a portion of the electrical current supplied by the secondary charging system 410 is electrically transmitted through at least a portion of primary charging system 408 that is disposed on vehicle 414. When secondary charging system 410 electrically charges battery 412, primary charging system 408 is configured to electrically break from electrically charging battery 412. Primary charging system 408 uses switch 461 to select the coupled secondary charging system 410 to electrically charge battery 412. Alternately, the secondary system may electrically charge the battery in combination with the primary system. Still yet alternately, the secondary system may be any type of charging system that is different from the power safety system 415 that is still useful to electrically charge battery 412.

Secondary charging system 410 electrically operates is a manner as previously described herein. Secondary charging system 410 is not in use when transfer switch 461 is not in a state that selects secondary charging system 410 to electrically charge battery 412. Secondary charging system 410 also not in use if secondary system is not electrically coupled to a live power source 417b.

Primary charging system 408 is not in use when the first portion of primary charging system 408 disposed external to vehicle 414 is not electrically connected to power source 417a. Primary charging system 408 is also not in use when transfer switch 461 is not in a state that selects primary charging system 408 to electrically charge battery 412.

Primary charging system 408 is partially in use when the first portion of primary charging system 408 disposed external to vehicle 414 is electrically connected to power source 417a and second portion of primary charging system 408 does not wireless receive energy from the first portion of the primary charging system 408.

Primary charging system 408 is in use when the first portion of primary charging system 408 disposed external to vehicle 414 is electrically connected to power source 417a and second portion of primary charging system 408 wirelessly receive energy from the first portion of the primary charging system 408 to be transferred to electrical current in the second portion of the primary charging system 408. Electrical current flows through second portion of primary charging system 408 when battery 412 requires electrical charge. Secondary charging system 410 is in use when transfer switch 461 is in a state that selects secondary charging system 410 to electrically charge battery 412 and when secondary system is electrically coupled to a live power source 417b.

Alternately, the off-vehicle and on-vehicle transducer may be any physical size and shape that allows a sufficient amount of energy to be transmitted there between as required in an electrical application of use.

In another alternate embodiment, an off-vehicle transducer may be employed in an application of use without using the animal deterrent device.

Alternately, while the on-vehicle transducer that includes the coil arrangement with the ferrite layer and the thermally-conductive silicon layer is previously described herein, this type of arrangement may be employed for use in any type of transducer that, for example, may also include the off-vehicle transducer. In a further alternate embodiment, both the on-vehicle transducer and the off-vehicle transducer are respectively constructed using the ferrite layer and the thermally-conductive silicon layer or any of the other transducer features as previously described herein. The off-vehicle transducer being disposed on the ground surface may have less of a need to effectively transfer heat due to being a larger overall size than the on-vehicle transducer.

Still yet alternately, the transducer having the ferrite layer and the thermally-conductive silicone layer that overlies the ferrite layer may be used in any type of vehicle or non-vehicle application where a transducer may be needed.

Alternately, while the heat transfer is desired in an upwards direction towards the aluminum cover, a thermally-conductive path may also be attained on the other side of the ferrite layer adjacent to the cavity portion of the on-vehicle transducer to achieve an even more effective heat transfer out of the on-vehicle transducer. Additional thermally-conductive silicone layers and/or metal layers may be added external to the first housing to achieve this greater heat transfer result and may be constructed in a manner similar to that which has been previously described herein.

Alternately, the animal deterrent device attached to the ground-based off-vehicle transducer may also discourage foreign objects, like the soda pop can, from occupying a space overlying the ground-based off-vehicle transducer especially when the on-vehicle transducer overlies the off-vehicle transducer.

In another alternate embodiment, the posts of the animal deterrent device may have non-flat ends. In one embodiment, for example, the ends may be concave rounded ends.

In a further alternate embodiment, the top external surface of the ground-based transducer may be any shape and size and the base of the animal deterrent device may be formed to conform to this shape and size.

In still another alternate embodiment, while the animal deterrent device is deployed on a transducer as part of a charging system as described herein, the animal deterrent device may be deployed on any type of apparatus where animal deterrence is needed. Still yet alternately, the animal deterrent device may be used independently of any apparatus where animal deterrence is needed.

In yet another alternate embodiment, the overall size of the animal deterrent device along with the size of the array of animal deterring elements may be tailored to suit the apparatus that needs animal deterrence.

In a further alternate embodiment, any type of device or apparatus that needs animal deterrence, especially spatial animal deterrence in relation to another device, may find the animal deterrent device useful. The animal deterrent device may be mountable to any type of solid material.

Still alternately, the on-vehicle transducer may be deposed along any portion of the undercarriage of the vehicle along the length of the vehicle. Still yet alternately, the on-vehicle transducer may be deployed anywhere on the vehicle.

In still other alternate embodiments, the silicone layer/ferrite arrangement may be employed for any type of transducer. This may include and not be limited to, for example, an off-vehicle transducer.

Alternately, a transducer may be utilized that does not employ the metal layer and/or the metallized cover. For instance, the cover may be formed of a dielectric material. Thus, this type of transducer arrangement, while still employing the silicone layer and the ferrite layer, may utilize a first and second housing formed completely of dielectric material. In yet another embodiment, the second silicone layer intermediate the first and the second housing may not be employed. This may help to reduce material costs in an application of use where thermal heat transfer out of the transducer is not particularly needed.

In yet another alternate embodiment, if the on-vehicle transducer is recessed above the lower level of the undercarriage, the additional space created thereat may be filled with a filling material such that animal deterrence is still effective with the animal deterrent device. The filling material, for example, may be formed of a plastic material or be a plastic panel that prevents the space from being occupied by the animal.

Thus, an on-vehicle transducer that effectively transfers heat out from the first housing that contains the ferrite layer and the thermally-conducive silicone layer during electrical charging of a battery has been presented. The two thermally-conductive silicone layers in combination with the copper housing portions disposed in opening s of the first housing assist to effectively transfer heat out of the on-vehicle transducer through the cover of the on-vehicle transducer in to an air environment adjacent the cover of the on-vehicle transducer. The layered approach of the elements that form the on-vehicle transducer allow for easy of manufacturability of transducer on an automated assembly line that may have a lower manufacturing cost. The materials of the on-vehicle transducer, such as cover formed of an aluminum metal material and the dielectric housing portions of the first housing, allow for the on-vehicle transducer to have reduced weight. An animal deterrent device is easily attachable to the cover of the off-vehicle transducer. The on-vehicle transducer having the thermally-conductive silicone layers is adaptable for use in many different charging system configurations. The animal deterrent device prevents animals and small foreign objects from entering a space intermediate the transducers to enable maximum energy transfer efficiency between the transducers has been presented. The animal deterrent device may be formed out of a thermoplastic material in a mold in a single molding process operation as a single unitary piece. The animal deterrent device is easily installed on the off-vehicle transducer using fasteners or adhesive. The animal deterring elements have a sufficient height that allow the animal deterrent device attached to the off-vehicle transducer to be within tolerances of a ground clearance of the vehicle but discourage and prevent an animal's body from being located in a space disposed intermediate the ends of the animal deterring elements and the on-vehicle transducer when the ends of the animal deterring elements underlie the undercarriage of the vehicle. This animal deterrence is particularly effective when the spacing of the posts in the array in the x-direction are about the same spacing as in the y-direction and the distance of the spacing between the ends of the posts and an external surface of the on-vehicle transducer is about the same distance as the distance of the x-direction. The animal deterring elements have sufficient strength so as to protrude upward from the base of the animal deterrent device while being resilient enough to support ingress from an animal disposed thereon. The animal deterrent device may be utilized in any charging system that has a ground-based transducer where animal deterrence is desired. In general, the animal deterrent device may be deployed with any type of apparatus where animal deterrence is needed and may be formed in a manner that allows deployment on many different apparatus shapes and sizes.

While this invention has been described in terms of the embodiments thereof, it is not intended to be so limited, but rather only to the extent set forth in the claims that follow.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to one or more embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

I claim:
1. A coil assembly, comprising:
a ferrite layer;
a first thermally-conductive silicone layer overlying the ferrite layer;
a first housing that surroundingly encloses the ferrite layer and the first thermally-conductive silicone layer;
a heat sink structure distinct from the ferrite layer disposed within an opening in the first housing, wherein the heat sink structure is in direct contact with the first thermally-conductive silicone layer and wherein the heat sink structure is in thermal communication with the first thermally-conductive silicone layer; and
a wire conductor wrapped about the first housing.

2. The coil assembly of claim 1, wherein the first housing is formed of a dielectric material.

3. The coil assembly of claim 1, further including,
a second thermally-conductive silicone layer disposed external to the first housing in an overlying relationship thereto and in thermal communication with the heat sink structure.

4. The coil apparatus of claim 3, further including,
a metal layer that overlies the second thermally-conductive silicone layer.

5. The coil assembly of claim 4, further comprising:
a second housing that enclosingly surrounds the first housing, wherein the second thermally-conductive silicone layer is disposed intermediate the first housing and an internal surface of the second housing.

6. The coil assembly of claim 5, wherein the second housing includes a cover and a cavity portion that includes a cavity configured to receive the first housing and wherein an air gap is disposed intermediate the first housing and an internal surface of the cavity portion of the second housing.

7. The coil assembly of claim 6, wherein the cover is formed from at least one of an aluminum material and an aluminum alloy material.

8. The coil assembly of claim 1, wherein the heat sink structure is a bar formed from at least one of a copper material and a copper alloy material.

9. The coil assembly of claim 1, wherein the coil apparatus is associated with an electrical charging system configured to electrically charge an energy storage device.

10. The coil assembly of claim 9, wherein the energy storage device and the coil apparatus are disposed on a vehicle.

11. The coil assembly of claim 1, wherein the first housing is intermediate the ferrite layer and the heat sink structure.

12. The coil assembly of claim 1, wherein the heat sink structure is not surrounded by the wire conductor.

13. An electrical coil assembly configured to wirelessly transmit electrical power, comprising:
a ferrite layer;
a first thermally-conductive silicone layer overlying the ferrite layer;
a housing formed of a dielectric material that encloses the ferrite layer and the first thermally-conductive silicone layer, said housing defining an opening separated from the ferrite layer;
a metallic structure disposed within the opening in the housing, wherein the metallic structure is in direct contact with the first thermally-conductive silicone layer and wherein the metallic structure is in thermal communication with the first thermally-conductive silicone layer;

a second thermally-conductive silicone layer disposed external to the housing in an overlying relationship thereto and in thermal communication with the metallic structure;
a metal layer that overlies the second thermally-conductive silicone layer, wherein the first thermally-conductive silicone layer, the metallic structure, the second thermally-conductive silicone layer, and the metal layer cooperate to transfer heat from the ferrite layer; and
a wire conductor wrapped about the housing.

* * * * *